(12) United States Patent
Wang et al.

(10) Patent No.: US 12,050,040 B2
(45) Date of Patent: Jul. 30, 2024

(54) COMPRESSOR LIQUID ACCUMULATOR AND COMPRESSOR COMPRISING SAME

(71) Applicant: GUANGDONG MEIZHI PRECISION-MANUFACTURING CO., LTD., Guangdong (CN)

(72) Inventors: Xiaofeng Wang, Guangdong (CN); Tao Zhou, Guangdong (CN); Yong Guo, Guangdong (CN); Shijia Ye, Guangdong (CN)

(73) Assignee: GUANGDONG MEIZHI PRECISION-MANUFACTURING CO., LTD., Guangdong (CN)

( * ) Notice: Subject to any disclaimer, the term of this patent is extended or adjusted under 35 U.S.C. 154(b) by 415 days.

(21) Appl. No.: 17/386,942

(22) Filed: Jul. 28, 2021

(65) Prior Publication Data

US 2021/0356183 A1 Nov. 18, 2021

Related U.S. Application Data

(63) Continuation of application No. PCT/CN2019/122017, filed on Nov. 29, 2019.

(30) Foreign Application Priority Data

Jun. 24, 2019 (CN) .......................... 201910549206.2

(51) Int. Cl.
*F25B 43/00* (2006.01)
*B23K 11/00* (2006.01)
(Continued)

(52) U.S. Cl.
CPC .......... *F25B 43/006* (2013.01); *B23K 11/002* (2013.01); *F04B 39/12* (2013.01); *B23K 2101/12* (2018.08); *F25B 2400/07* (2013.01)

(58) Field of Classification Search
CPC . F25B 43/006; B23K 11/002; B23K 2101/12; F04B 39/12; F04B 39/0072; F04C 2240/804
(Continued)

(56) References Cited

FOREIGN PATENT DOCUMENTS

| CN | 1141394 A | 1/1997 |
|----|-----------|--------|
| CN | 202648274 U | 1/2013 |

(Continued)

OTHER PUBLICATIONS

International Search Report and Written Opinion dated Mar. 25, 2020 received in International Application No. PCTCN2019122017.
(Continued)

*Primary Examiner* — Steve S Tanenbaum
(74) *Attorney, Agent, or Firm* — Scully, Scott, Murphy & Presser, P.C.

(57) ABSTRACT

A compressor liquid accumulator and a compressor are provided. The compressor liquid accumulator has a first suction cup and a second suction cup. The surface of the first suction cup, which faces the second suction cup, is provided with a first welding surface. The facing of the second suction cup, which faces the first suction cup, is provided with a second welding surface. The first welding surface and the second welding surface are connected in a welded manner. The first suction cup and the second suction cup define a cavity. The first suction cup is provided with a first extending portion is adjacent to the first welding surface. The first extending portion is located in a part of the cavity defined by the second suction cup.

16 Claims, 6 Drawing Sheets

(51) Int. Cl.
    *B23K 101/12*     (2006.01)
    *F04B 39/12*     (2006.01)
(58) Field of Classification Search
    USPC ........................................................ 62/503
    See application file for complete search history.

(56)             References Cited

FOREIGN PATENT DOCUMENTS

| CN | 102966516 | A | | 3/2013 |
|----|-----------|---|---|--------|
| CN | 103527483 | A | | 1/2014 |
| CN | 103900306 | A | | 7/2014 |
| CN | 203785349 | U | | 8/2014 |
| CN | 104047861 | A | | 9/2014 |
| CN | 104165142 | A | | 11/2014 |
| CN | 105402962 | A | | 3/2016 |
| CN | 207797469 | U | | 8/2018 |
| CN | 208635388 | U | | 3/2019 |
| CN | 208635388 | U | * | 3/2019 |
| JP | H0645859 | B2 | | 6/1994 |
| JP | H07317844 | A | | 12/1995 |
| JP | H09-256970 | A | | 9/1997 |
| JP | 2002042595 | A | | 2/2002 |
| JP | 2013137111 | A | | 7/2013 |
| JP | 2016-020778 | A | | 2/2016 |
| JP | 2017512963 | A | | 5/2017 |
| WO | 2012026004 | A1 | | 3/2012 |
| WO | 2015/158041 | A1 | | 10/2015 |

OTHER PUBLICATIONS

First Office Action dated Apr. 26, 2021 received in Chinese Patent Application No. CN 201910549206.2.
Notice of Reasons for Refusal dated Jun. 21, 2022 received in Japanese Patent Appliction No. JP 2021-536772.
Extended European Search Report dated Feb. 23, 2022 received in European Patent Application No. EP 19934779.0.
Reexamination Notice dated Dec. 27, 2023 received in Chinese Patent Application No. CN 201910549206.2.
Written Opinion dated Mar. 25, 2020 received in International Application No. PCT/CN2019/122017.
Feng, X., "Concise Manual of Welding Processes (Second Edition)", Shanghai Science and Technology Press, Sep. 2014, pp. 148-150 and 162-164.
Hua, L., "Practical Handbook on Main Packaging Characteristics and Resource Recycling", China Environmental Science Press, Oct. 2010, pp. 60-61.

* cited by examiner

COMPRESSOR LIQUID ACCUMULATOR AND COMPRESSOR COMPRISING SAME

CROSS-REFERENCE TO RELATED APPLICATIONS

The present application is a continuation application of PCT International Application No. PCT/CN2019/122017, filed on Nov. 29, 2019, which claims priority to and benefits of Chinese Patent Application No. 201910549206.2, filed on Jun. 24, 2019, the entire contents of which are incorporated herein by reference for all purposes. No new matter has been introduced.

FIELD

This application relates to the technical field of refrigeration equipment, and in particular, to a compressor liquid accumulator and a compressor comprising the same.

BACKGROUND

Compressor is a type of driven fluid machinery that promotes low-pressure gas to high-pressure gas, which is the heart of a refrigeration system. The compressor generally includes a compressor body and a liquid accumulator. For the liquid accumulator in the related art, its fixing means is of disadvantages of complicated process and high manufacturing cost.

SUMMARY

The present disclosure aims to solve one of the technical problems in the related art at least to a certain extent.

For this, one aspect of the present disclosure is to provide a compressor liquid accumulator, which has the advantages of a simple structure, a high welding efficiency and a low cost.

Another aspect of the present disclosure is to provide a compressor comprising the compressor liquid accumulator as described above.

According to embodiments in a first aspect of the present disclosure, there is provided a compressor liquid accumulator, comprising: a first suction cup and a second suction cup, wherein a surface, facing the second suction cup, of the first suction cup is provided with a first welding surface, a surface, facing the first suction cup, of the second suction cup is provided with a second welding surface, and the first welding surface and the second welding surface are connected in a welded manner, the first suction cup and the second suction cup define a cavity, and the first suction cup is provided with a first extending portion, wherein the first extending portion is adjacent to the first welding surface and located in the cavity defined by the second suction cup.

According to the compressor liquid accumulator in embodiments of the present disclosure, a first suction cup provided with a first welding surface and a second suction cup provided with a second welding surface are provided, and the first suction cup is provided with a first extending portion which can be located in the cavity of the second suction cup, thereby reducing the influence of welding process on the performance of other parts of the compressor liquid accumulator, thus benefiting to the improvement of welding quality, simplifying the welding process, improving the welding efficiency, and saving cost. Further, the stability of the mating connection between the first suction cup and the second suction cup can be increased, thus improving the stability of the compressor liquid accumulator. Furthermore, the efficiency of the mating connection between the first suction cup and the second suction cup can be increased, thus improving the production efficiency.

According to embodiments of the present disclosure, the first suction cup comprises:

a first body portion, a flanging portion, formed by folding the first body portion toward an edge of the second suction cup and toward the exterior of the cavity, wherein a surface, facing towards the second suction cup, of the flanging portion is the first welding surface and the first extending portion is disposed at the flanging portion.

According to embodiments of the present disclosure, a wall thickness of the second suction cup is L1, and a width of the first welding surface is L2 in a direction of the wall thickness of the second suction cup, wherein $0.6 \leq L2/L1 \leq 1$.

According to embodiments of the present disclosure, a wall thickness of the second suction cup is L1, and a welding fusion portion is formed at a welding position of the first welding surface and the second welding surface, a width of the welding fusion portion is L2' in a direction of the wall thickness of the second suction cup, wherein $0.6 \leq L2'/L1 \leq 1.2$.

According to embodiments of the present disclosure, the width of the welding fusion portion is L2', wherein $L2' \geq 1$ mm.

According to embodiments of the present disclosure, a smooth transition portion is provided between the first body portion and the flanging portion.

According to embodiments of the present disclosure, a thickness of the smooth transition portion is Bt1, and a thickness of the first body portion is At1, wherein $Bt1 > At1$.

According to embodiments of the present disclosure, the first extending portion is a protrusion.

According to embodiments of the present disclosure, there is one first extending portion, the first extending portion is of a ring-shape, and the first extending portion extends along a circumferential direction of the first suction cup.

According to embodiments of the present disclosure, there is a plurality of the first extending portions, and the plurality of the first extending portions are distributed at intervals along a circumferential direction of the first suction cup.

According to embodiments of the present disclosure, the first welding surface and the second welding surface are connected by a resistance welding process.

According to embodiments of the present disclosure, the first suction cup is provided with a first suction tube, the first suction tube is in communication with the cavity, and the first suction tube and the first suction cup are fixed by flame brazing, induction brazing or resistance welding.

According to embodiments of the present disclosure, the compressor liquid accumulator further comprises a third suction cup, wherein the third suction cup is connected to the second suction cup, and the second suction cup is located between the first suction cup and the third suction cup.

According to embodiments of the present disclosure, a surface, facing the second suction cup, of the third suction cup is provided with a third welding surface, a surface, facing the third suction cup, of the second suction cup is provided a fourth welding surface on, and the third welding surface and the fourth welding surface are connected in a welded manner.

According to embodiments of the present disclosure, one of the third suction cup and the second suction cup comprises a second extending portion, the second extending portion is located in the cavity, and the second extending portion abuts against a corresponding second suction cup or a corresponding third suction cup.

According to embodiments in a second aspect of the present disclosure, there is provided a compressor comprising the compressor liquid accumulator as described above.

According to the compressor in embodiments of the present disclosure, a first suction cup provided with a first welding surface and a second suction cup provided with a second welding surface are provided, and the first suction cup is provided with a first extending portion which can be located in the cavity of the second suction cup, thereby reducing the influence of welding process on the performance of other parts of the compressor liquid accumulator, thus benefiting to the improvement of welding quality, simplifying the welding process, improving the welding efficiency, and saving cost. Further, the stability of the mating connection between the first suction cup and the second suction cup can be increased, thus improving the stability of the compressor liquid accumulator. Furthermore, the efficiency of the mating connection between the first suction cup and the second suction cup can be increased, thus improving the production efficiency.

DESCRIPTION OF REFERENCE NUMERALS

Compressor liquid accumulator 100;
First suction cup 110;
First body portion 111;
Flanging portion 112;
First welding surface 1121;
First extending portion 1122;
First transition portion 113;
First suction tube 114;
Thickness of first body portion at1;
Thickness of flanging portion ct1;
Thickness of first transition portion bt1;
Wall thickness at first welding surface dt1;
Outside diameter of first extending portion f;
Second suction cup 120;
Second welding surface 121;
Cavity 122;
Fourth welding surface 123;
Sharp corner 124;
Inner diameter of second suction cup f;
Third suction cup 130;
Second body portion 131;
Folded portion 132;
Third welding surface 1321;
Second extending portion 1322;
Second transition portion 133;
Second suction tube 134;
Thickness of second body portion at2;
Thickness of folded portion ct2;
Thickness of second transition portion bt2;
Wall thickness at third welding surface dt2;
Outside diameter of second extending portion e;
Filter assembly 140.

DETAILED DESCRIPTION OF EMBODIMENTS

The embodiments of the present disclosure are described in detail below. Examples of the embodiments are shown in the accompanying drawings, in which the same or similar reference numerals indicate the same or similar elements or elements with the same or similar functions. The embodiments described below with reference to the drawings are exemplary and are intended to explain the present disclosure, which should not be understood as a limitation to the present disclosure.

The compressor liquid accumulator 100 according to an embodiment of the present disclosure is described in detail below with reference to the accompanying drawings.

Referring to FIGS. 1-11, the compressor liquid accumulator 100 according to certain embodiments in a first aspect of the present disclosure includes a first suction cup 110 and a second suction cup 120.

Figure 1:
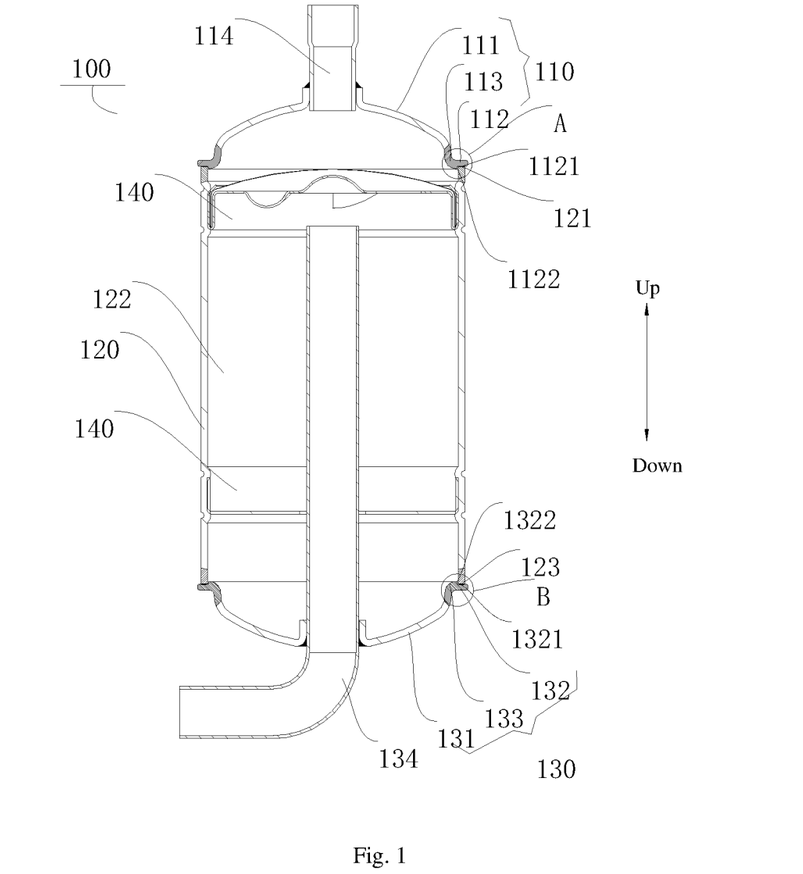
FIG. 1 is a schematic diagram showing a structure of a compressor liquid accumulator according to an embodiment of the present disclosure.
Figure 2:
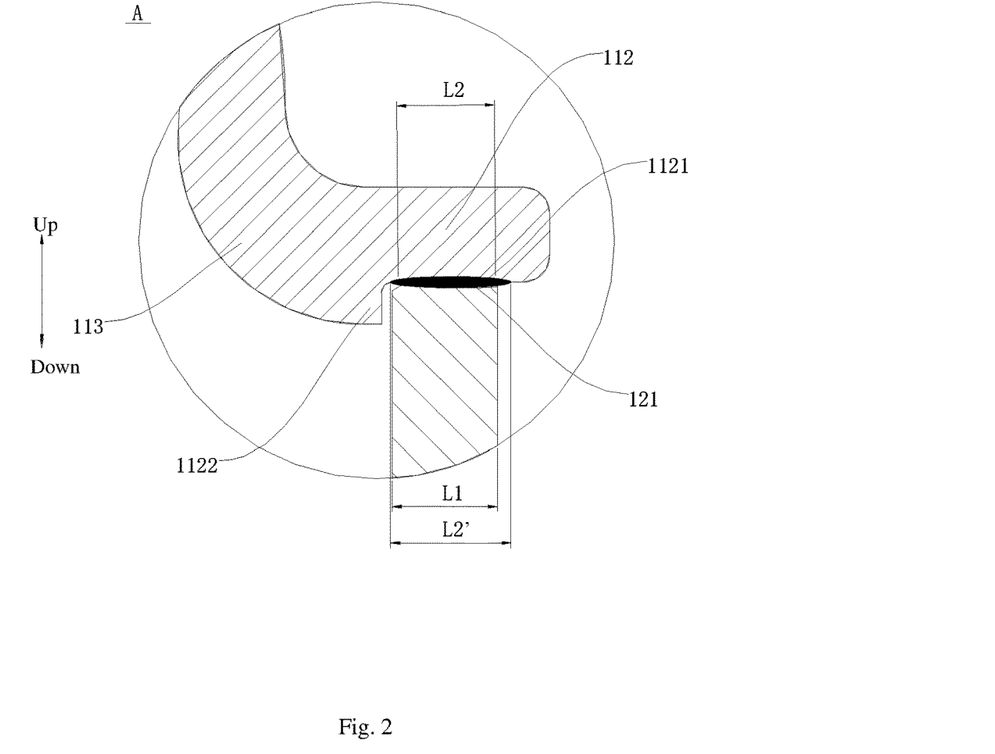
FIG. 2 is an enlarged view of part A in FIG. 1.

As shown in FIGS. 1 and 2, a surface, facing the second suction cup 120, of the first suction cup 110 is provided with a first welding surface 1121. It can be understood that the first welding surface 1121 is opposite to an end surface of the second suction cup 120. A surface, facing the first suction cup 110, of the second suction cup 120 is provided with a second welding surface 121. That is, the second welding surface 121 is opposite to an end surface of the first suction cup 110.

The first welding surface 1121 and the second welding surface 121 are opposite and the first welding surface 1121 and the second welding surface 121 can be connected, so that the first suction cup 110 and the second suction cup 120 can be connected together in a mated manner, and the first suction cup 110 and the second suction cup 120 connected in a mated manner can define a cavity 122. It can be understood that the connection between the first suction cup 110 and the second suction cup 120 can be realized by the welding connection between the first welding surface 1121 and the second welding surface 121. That is, the overall connection process of the first suction cup 110 and the second suction cup 120 can be concentrated on the welding process of the first welding surface 1121 and the second welding surface 121. Therefore, the influence of the welding process on the performance of other parts of the compressor liquid accumulator 100 can be reduced, which is beneficial to the improvement of welding quality, simplifies the welding process, improves welding efficiency and saves the cost.

For example, as shown in FIG. 1, the first suction cup 110 may be located above the second suction cup 120 (above as shown in FIG. 1). The first suction cup 110 has an opening toward the second suction cup 120, and the second suction cup 120 may also have an opening toward the first suction cup 110. The first suction cup 110 may be connected to the second suction cup 120 to allow the opening of the first suction cup 110 to be in corresponding communication with the opening of the second suction cup 120. At this time, as shown in FIG. 2, a part of the first suction cup 110 is in contact with the second suction cup 120 and the surface of this part may be the first welding surface 1121. A part of the second suction cup 120 is in contact with the first suction cup 110 and the surface of this part may be the second welding surface 121. The first welding surface 1121 is opposite to the second welding surface 121.

It should be noted that the first suction cup 110 may be also provided with a first extending portion 1122, the first extending portion 1122 can be adjacent to the first welding surface 1121, and the first extending portion 1122 can be located in a part of the cavity 122 defined by the second suction cup 120. Therefore, the positional relationship between the first extending portion 1122 and the second suction cup 120 can be used to facilitate the realization of limiting and positioning the mating connection of the first suction cup 110 and the second suction cup 120 in a circumferential direction of the opening of the first suction cup 110 when the first suction cup 110 and the second suction cup 120 are connected in a mated manner. Thus, the stability of the mating connection between the first suction cup 110 and the second suction cup 120 can be improved, thereby improving the stability of the compressor liquid accumulator 100. Further, the efficiency of the mating connection between the first suction cup 110 and the second suction cup 120 can be also improved, thereby increasing the production efficiency.

For example, as shown in FIG. 1, the first suction cup 110 may be located above the second suction cup 120. The first suction cup 110 may have an opening facing the second suction cup 120. The first suction cup 110 may be provided with a portion extending to the cavity 122 of the second suction cup 120 along the direction of the opening facing the second suction cup. The extending portion may be a first extending portion 1122.

According to the compressor liquid accumulator 100 of certain embodiments of the present disclosure, a first suction cup 110 provided with a first welding surface 1121 and a second suction cup 120 provided with a second welding surface 121 are provided, and the first suction cup 110 is provided with a first extending portion 1122 which can be located in the cavity 122 of the second suction cup 120, thereby reducing the influence of welding process on the performance of other parts of the compressor liquid accumulator 100, thus improving welding quality, simplifying the welding process, improving welding efficiency, and saving cost. Further, the stability of the mating connection between the first suction cup 110 and the second suction cup 120 can be increased, thus improving the stability of the compressor liquid accumulator 100. Furthermore, the efficiency of the mating connection between the first suction cup 110 and the second suction cup 120 can be increased, thus improving the production efficiency.

According to some embodiments of the present disclosure, referring to FIGS. 1 and 2, the first suction cup 110 may further include a first body portion 111 and a flanging portion 112. The flanging portion 112 is formed by folding the first body portion 111 toward an edge of the second suction cup 120 and toward the exterior of the cavity 122, and a surface facing towards the second suction cup 120, of the flanging portion 112 is the first welding surface 1121 and the first extending portion 1122 is disposed at the flanging portion 112. Therefore, by disposing the first extending portion 1122 at the flanging portion 112 and using the surface facing towards the second suction cup 120, of the flanging portion 112 as the first welding surface 1121, the mating between the first extending portion 1122 and the second suction cup 120 can be used to make the welding and mating between the first welding surface 1121 and the second suction cup 120 more precise and stable.

As shown in FIGS. 1 and 2, the cooperation between the first extending portion 1122 and the second suction cup 120 can have a limiting effect in the plane direction of the first welding surface 1121, thereby can reduce the probability of damage to the welding and mating between the first welding surface 1121 and the second suction cup 120 due to excessive force when the external force in the plane direction of the first welding surface 1121 acts on the first suction cup 110. In addition, the cooperation between the first extending portion 1122 and the second suction cup 120 can also have a good positioning effect, which is beneficial to the welding connection of the first welding surface 1121 and the second suction cup 120 to locate the welding spot, thereby improving the welding efficiency.

For example, as shown in FIGS. 1 and 2, the first suction cup 110 may be connected above the second suction cup 120 to define a cavity 122. A portion, located in an internal space of the first suction cup 110, of the cavity 122 is defined by a part of body portion of the first suction cup 110. The part of body portion of the first suction cup 110 defining the portion of the cavity 122 may be referred to as a first body portion 111. A part, close to an edge of the second suction cup 120, of the first body portion 111 may be folded toward the edge of the second suction cup 120 and toward the outside of the cavity 122, and the folded part formed thereby may be a flanging portion 112.

As shown in FIGS. 1 and 2, a part of the flanging portion 112 is located above the edge of the second suction cup 120 and can be welded to the second suction cup 120. A surface of the part of the flanging portion 112 which can be welded to the second suction cup 120 may be the first welding surface 1121. A part of the flanging portion 112 may extend into the cavity 122 of the second suction cup 120, and an extending portion of the flanging portion 112 may be tightly adjacent to the inner wall of the second suction cup 120, and the extending portion of the flanging portion 112 may be the first extending portion 1122.

According to some embodiments of the present disclosure, referring to FIG. 2, a wall thickness of the second suction cup 120 is L1, and a width of the first welding surface 1121 in the wall thickness direction of the second suction cup 120 may be L2, which can satisfy $0.6 \leq L2/L1 \leq 1$, so that an optimal value of L2/L1 can be selected according to actual needs, thereby the strength and stability of the welding connection can be improved. For example, L2/L1 can be 0.7, 0.8, or 0.9.

According to some embodiments of the present disclosure, referring to FIG. 2, a welding fusion portion is formed at a welding position of the first welding surface 1121 and the second welding surface 121. A width of the welding fusion portion is L2' in a direction of the wall thickness of the second suction cup 120, in which $0.6 \leq L2'/L1 \leq 1.2$, so that an optimal value of L2'/L1 can be selected according to the strength requirements of the welding connection. It is understandable that the welding fusion portion is not limited to being completely located within the edge range of the peripheral wall of the second suction cup 120 in the wall thickness direction. For example, L2'/L1 can be 1.1 or 1.2, by which a part of the welding fusion portion is located outside the edge range of the peripheral wall of the second suction cup 120 in the wall thickness direction of the second suction cup 120.

According to some embodiments of the present disclosure, the width of the welding fusion portion is L2', and L2'≥1 mm. Thereby, the size of the welding fusion portion can be optimized according to different sizes of the compressor liquid accumulator 100, so that the compressor liquid accumulator 100 can have good connection strength and stability while reducing production costs. For example, L2' can be 2 mm, 4 mm, or 6 mm.

According to some embodiments of the present disclosure, a smooth transition portion can be provided between the first body portion 111 and the flanging portion 112. Thereby, the stress of material can be reduced during the folding process of a part of the first body portion 111 to form the flanging portion 112, thus reducing the difficulty of forming the flanging portion 112.

For example, as shown in FIGS. 1 and 2, the part, close to the edge of the second suction cup 120, of the first body portion 111 may be folded toward the edge of the second suction cup 120 and toward the outside of the cavity 122 to form the flanging portion 112. There is a large angular difference between a plane where the flanging portion 112 is located and an extension plane of the part, close to the edge of the second suction cup 120, of the first body portion 111, so that a smooth transition portion in an arc-shape can be formed between the flanging portion 112 and the first body portion 111, and the smooth transition portion may also be referred to as the first transition portion 113.

Figure 4:
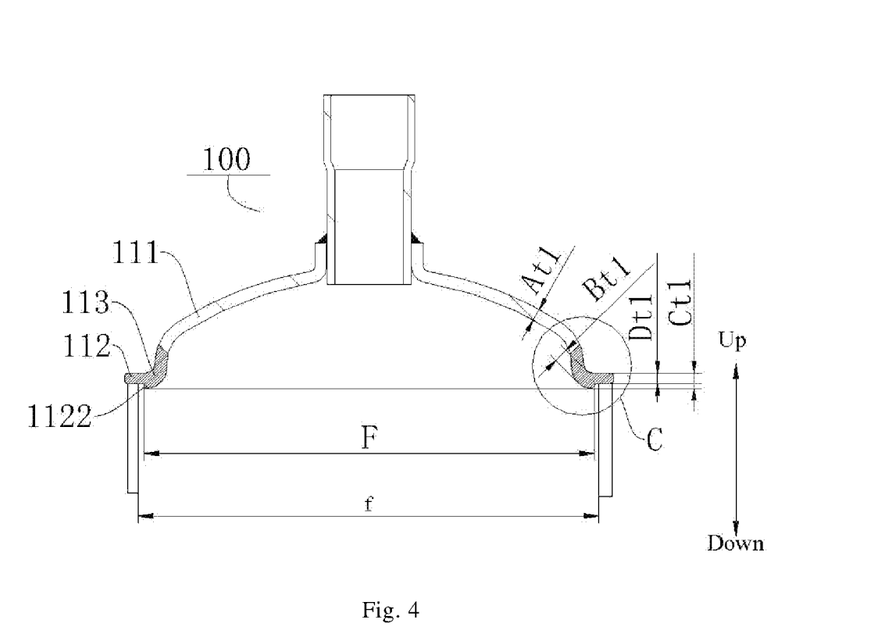
FIG. 4 is a schematic diagram showing a partial structure of the compressor liquid accumulator.
Figure 5:
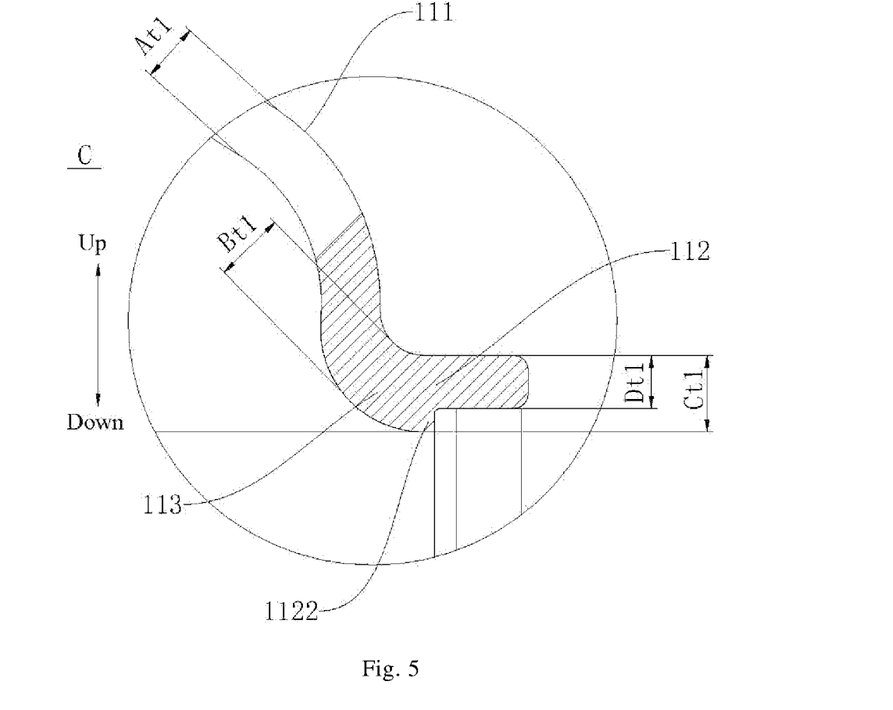
FIG. 5 is an enlarged view of part C in FIG. 4.

According to some embodiments of the present disclosure, referring to FIGS. 4 and 5, a thickness of the first transition portion 113 is Bt1, and a thickness of the first body portion 111 is At1, which may satisfy Bt1>At1. It can be understood that, in the process of folding the first body portion 111 to form the flanging portion 112, the thickness of the flanging portion 112 formed during folding the first body portion 111 can be increased along with stretching material. Meanwhile, the stress concentration at the bending position can be reduced, and thus the possibility of fatigue damage of the flanging portion 112 can be reduced.

According to some embodiments of the present disclosure, the first extending portion 1122 may be formed as a protrusion. Therefore, by configuring the first extending portion 1122 as a protruding structure, the first extending portion 1122 and the second suction cup 120 can form a mating fit, which is beneficial to positioning and limiting the mating connection of the first extending portion 1122 and the second suction cup 120.

According to some embodiments of the present disclosure, the first extending portion 1122 may be of a ring-shape, and the first extending portion 1122 extends along a circumferential direction of the first suction cup 110. It can be understood that the ring-shaped first extending portion 1122 can be a closed structure, and the ring-shape structure has a high stability. Therefore, by providing the ring-shaped first extending portion 1122, the positioning and limiting capabilities of the first extending portion 1122 can be improved, and the sealing performance of the compressor liquid accumulator 100 can be also improved due to the airtightness of the ring-shaped structure.

According to some embodiments of the present disclosure, there can be a plurality of first extending portions 1122, and the plurality of first extending portions 1122 may be distributed at intervals along the circumferential direction of the first suction cup 110. Therefore, the number and position of the first extending portion 1122 can be selected according to actual needs, thus saving materials and costs.

According to some embodiments of the present disclosure, the first welding surface 1121 and the second welding surface 121 can be connected by a resistance welding process. It should be noted that, during the welding operation of resistance welding, the heat is relatively concentrated, and the heat generated by welding process has little effect on other areas of the compressor liquid accumulator 100, thereby reducing adverse effects of the heat generated by welding on the compressor liquid accumulator 100. Further, welding parts by resistance welding would not produce large deformation and stress, usually correction and heat treatment procedures do not need to be arranged after welding, which can improve production efficiency and reduce costs. In addition, resistance welding does not require filler metals such as welding wire, welding rod and the like, so that it is suitable for operation in a small space and the welding cost is low.

Resistance welding refers to a method that uses a strong current to pass through the contact point between the electrode and the workpiece and achieves welding by contacting resistance to generate heat. Resistance welding is divided into spot welding, projection welding, seam welding, butt welding, resistance bolt welding and the like, and is characterized by short power-on time, high production efficiency and stable welding quality.

Figure 8:
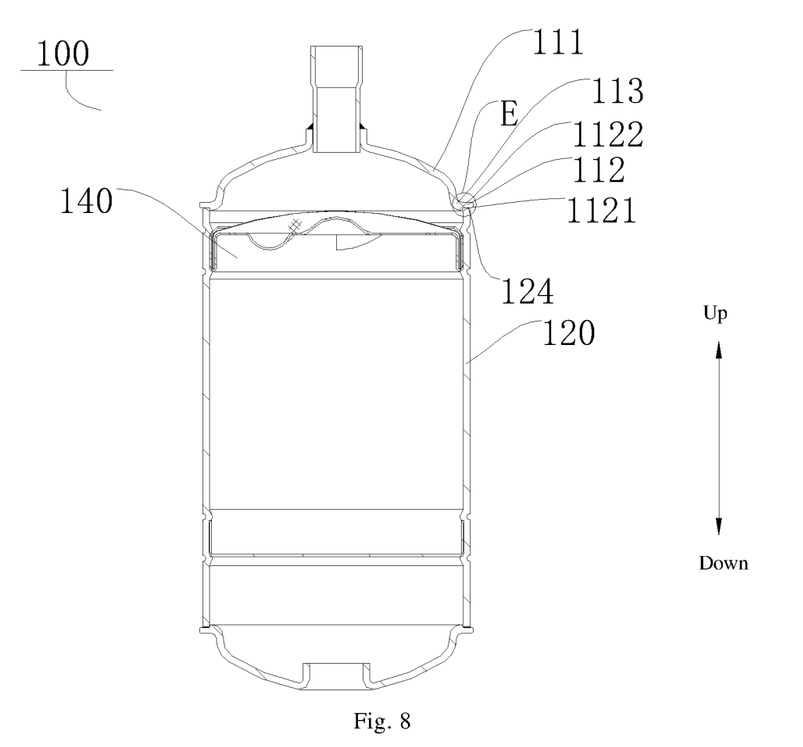
FIG. 8 is a schematic diagram showing a structure of a compressor liquid accumulator according to another embodiment of the present disclosure.

According to some embodiments of the present disclosure, referring to FIG. 8, the first suction cup is provided with a first suction tube 114, the first suction tube 114 can be in communication with the cavity 122 to communicate the cavity 122 with the outside, and the first suction tube 114 and the first suction cup 110 are fixed by flame brazing, induction brazing or resistance welding. It can be understood that an optimized welding method can be selected according to the shape and size of the first suction tube 114 to meet the requirements of the connection strength between the first suction tube 114 and the first suction cup 110.

It should be noted that the flame brazing is divided into torch brazing and flame soldering. Flame brazing uses the flame of combustible gas mixed with oxygen or compressed air as the heat source for welding, and flame brazing can use multiple flames to heat and weld at the same time according to the shape of workpiece, which is suitable for welding small components.

Induction brazing is a welding method that uses high-frequency, intermediate-frequency or power-frequency induction current as a heat source. High frequency heating is suitable for welding thin-wall pipe fittings. The use of coaxial cables and split-combination induction coils can be used for brazing at sites far away from the power source, and is particularly suitable for welding some large components, such as welding pipe joints that need to be disassembled on rockets.

According to some embodiments of the present disclosure, referring to FIG. 1, the compressor liquid accumulator 100 may further include a third suction cup 130. The third suction cup 130 may be connected to the second suction cup 120, and the second suction cup 120 is located between the first suction cup 110 and the third suction cup 130. Therefore, by disposing the first suction cup 110, the second suction cup 120 and the third suction cup 130 to be connected in sequence, the internal space of the compressor liquid accumulator 100 can be defined to accommodate working components of the compressor liquid accumulator 100, and thus storage space for refrigerant is provided.

For example, as shown in FIG. 1, the first suction cup 110 is located above the second suction cup 120, and the first suction cup 110 is connected with the second suction cup 120 to define the cavity 122. The cavity 122 defined by both the first suction cup 110 and the second suction cup 120 has an opening in a downward direction. In order to realize the structure of the cavity 122 into a sealed structure with accommodating effect, a component can be provided under the second suction cup 120 to cover the opening in a downward direction of the cavity 122. The component may be referred to as a third suction cup 130.

Figure 3:
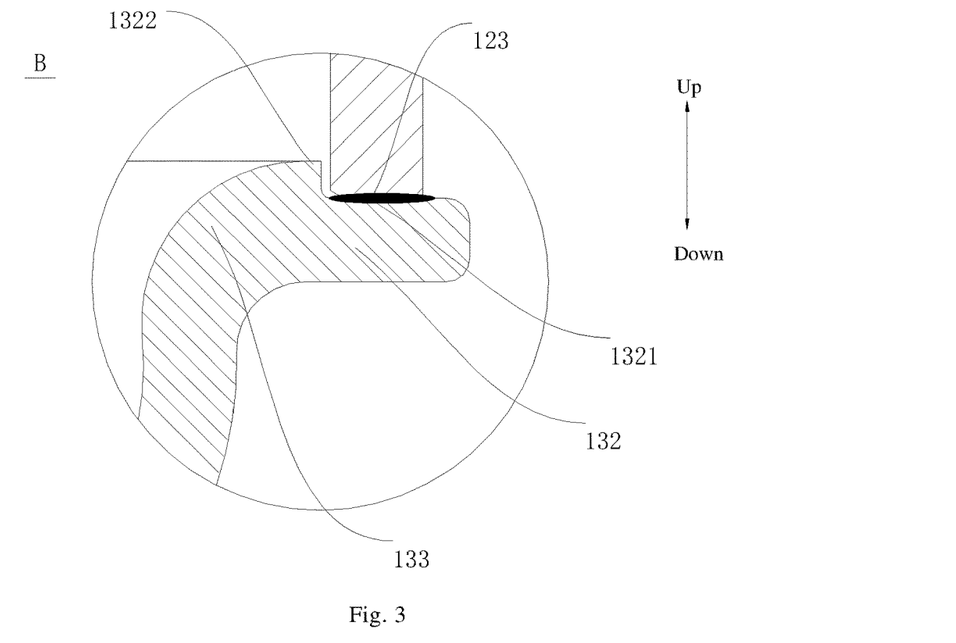
FIG. 3 is an enlarged view of part B in FIG. 1.

According to some embodiments of the present disclosure, referring to FIGS. 1 and 3, a surface, facing the second suction cup 120, of the third suction cup 130 is provided with a third welding surface 1321. A surface, facing the third suction cup 130, of the second suction cup 120 is provided a fourth welding surface 123, and the third welding surface 1321 and the fourth welding surface 123 are connected in a welded manner. Thus, the welding connection between the third welding surface 1321 and the fourth welding surface 123 can be used to connect the second suction cup 120 and the third suction cup 130 together. That is, the overall connection process of the second suction cup 120 and the third suction cup 130 can be concentrated on the welding process of the third welding surface 1321 and the fourth welding surface 123. Therefore, the influence of the welding process on the performance of other parts of the compressor liquid accumulator 100 can be reduced, which is beneficial to the improvement of welding quality, simplifies the welding process, improves welding efficiency and saves the cost.

According to some embodiments of the present disclosure, referring to FIGS. 1 and 3, one of the third suction cup 130 and the second suction cup 120 may have a second extending portion 1322, the second extending portion 1322 can be located in the cavity 122, and the second extending portion 1322 abuts against a corresponding second suction cup 120 or a corresponding third suction cup 130. It can be understood that the third suction cup 130 may have a second extending portion 1322, and the second extending portion 1322 can abut against the second suction cup 120.

The second suction cup 120 may be provided with a second extending portion 1322, and the second extending portion 1322 can abut against the third suction cup 130. Therefore, limiting and positioning the connection of the third suction cup 130 and the second suction cup 120 can be realized by providing the second extending portion 1322 at one of the third suction cup 130 and the second suction cup 120 and making the second extending portion 1322 to abut against suction cup.

For example, as shown in FIGS. 1 and 3, the third suction cup 130 may be located below the second suction cup 120. The third suction cup 130 may have an opening facing towards the second suction cup 120. The third suction cup 130 may have a portion extending to the cavity 122 of the second suction cup 120 along the direction of the opening facing the second suction cup, and the extending portion may be a second extending portion 1322.

According to embodiments in a second aspect of the present disclosure, there is provided a compressor comprising the compressor liquid accumulator 100 as described above.

According to the compressor in embodiments of the present disclosure, a first suction cup 110 provided with a first welding surface 1121 and a second suction cup 120 provided with a second welding surface 121 are provided, and the first suction cup 110 is provided with a first extending portion 1122 which can be located in the cavity 122 of the second suction cup 120, thereby reducing the influence of welding process on the performance of other parts of the compressor liquid accumulator 100, thus improving welding quality, simplifying the welding process, improving the welding efficiency, and saving cost. Further, the stability of the mating connection between the first suction cup 110 and the second suction cup 120 can be increased, thus improving the stability of the compressor liquid accumulator 100. Furthermore, the efficiency of the mating connection between the first suction cup 110 and the second suction cup 120 can be increased, thus improving the production efficiency.

Hereinafter, the compressor liquid accumulator 100 according to the present disclosure will be described in detail with reference to FIGS. 1 to 11. It should be understood that the following description is only an exemplary description, rather than a specific limitation to the application.

As shown in FIGS. 1 to 3, the compressor liquid accumulator 100 includes a first suction cup 110, a second suction cup 120 and a third suction cup 130.

As shown in FIG. 1, the first suction cup 110 is located above the second suction cup 120, and the second suction cup 120 is located below the third suction cup 130. The first suction cup 110 has an opening facing toward the second suction cup 120, and the second suction cup 120 may also have an opening facing toward the first suction cup 110. The first suction cup 110 may be connected to the second suction cup 120 to allow the opening of the first suction cup 110 to be in corresponding communication with the opening of the second suction cup 120 and define a cavity 122. The first suction cup 110 includes a first body portion 111. The first body portion 111 is located above the opening of the second suction cup 120, and the first body portion 111 is buckled with the opening of the second suction cup 120. A part, close to an edge of the second suction cup 120, of the first body portion 111 may be folded towards the outside of the cavity 122 to form a flanging portion 112. A part of the flanging portion 112 is located above the peripheral wall of the second suction cup 120. A first welding surface 1121 can be formed on a surface of the part of the flanging portion 112, located above the edge of the second suction cup 120. A second welding surface 121 can be formed at a position where the edge of the second suction cup 120 corresponds to the first welding surface 1121. The first welding surface 1121 is opposite to the second welding surface 121, and the first welding surface 1121 and the second welding surface 121 can be connected by a resistance welding process.

As shown in FIGS. 1 and 2, a part of the flanging portion 112 may extend toward the cavity 122 of the second suction cup 120 to form a first extending portion 1122, and the first extending portion 1122 can be located inside the peripheral wall of the second suction cup 120. A gap may be provided between the first extending portion 1122 and the inner peripheral wall of the second suction cup 120. The sidewall, close to the first welding surface 1121, of the first extending portion 1122 forms a stepped surface with the first welding surface 1121.

As shown in FIG. 4, the first extending portion 1122 can extend along the circumferential direction of the first suction cup 110. The outer diameter of the first extending portion 1122 can be set to F and the inner diameter of the second suction cup 120 can be set to f, which needs to satisfy that f is greater than F. Thus, it can be realized that the first extending portion 1122 is partially located in the cavity 122 of the second suction cup 120, and the first extending portion 1122 abutting against the inner peripheral wall of the second suction cup 120 can be used to realize the positioning and limiting of the mating connection of the first suction cup 110 and the second suction cup 120.

As shown in FIGS. 1 and 2, there is a large angular difference between a plane where the flanging portion 112 is located and an extension plane of the part, close to the edge of the second suction cup 120, of the first body portion 111, so that a first transition portion 113 having a transitional connection function can be formed between the flanging portion 112 and the first body portion 111. As shown in FIG. 5, the wall thickness of the first body portion 111 can be set to At1, the wall thickness of the flanging portion 112 can be set to Ct1, the wall thickness of the first transition portion 113 can be set to Bt1, and the distance between the second welding surface 121 and the upper surface of the flanging portion 112 is Dt1 in the up and down direction (the "up and down" herein refers to the positive "up and down" direction in FIG. 5), which needs to satisfy Bt1>At1.

In this way, the flanging portion 112 formed by folding the first body portion 111 can have a sufficient thickness to serve as a connecting portion between the first suction cup 110 and the second suction cup 120. For Ct1>Dt1, it can be understood that the size difference between Ct1 and Dt1 is the portion of the first extending portion 1122 that extends into the cavity 122 of the second suction cup 120. By setting Ct1>Dt1, the first extending portion 1122 can be partially disposed inside the cavity 122 of the second suction cup 120 for abutting fit with the inner peripheral wall of the second suction cup 120.

As shown in FIGS. 1 and 3, the second suction cup 120 has an opening facing toward the third suction cup 130, and the third suction cup 130 may also have an opening facing toward the second suction cup 120. The third suction cup 130 may be connected to the second suction cup 120 to allow the opening of the third suction cup 130 to be in corresponding communication with the opening of the second suction cup 120 and defines a cavity 122. The third suction cup 130 may include a second body portion 131, the second body portion 131 is located below the opening of the second suction cup 120, and the second body portion 131 is buckled with the opening of the second suction cup 120.

As shown in FIGS. 1 and 3, a part, close to an edge of the second suction cup 120, of the second body portion 131 may be folded towards the outside of the cavity 122 to form a folded portion 132. A part of the folded portion 132 is located below the edge of the second suction cup 120. A surface, located below the edge of the second suction cup 120, of the part of the folded portion 132 can be provided with a third welding surface 1321. A surface, corresponding to the third welding surface 1321, on the edge of the second suction cup 120 can be provided with a fourth welding surface 123. The third welding surface 1321 is opposite to the fourth welding surface 123, and the third welding surface 1321 and the fourth welding surface 123 may be connected by a resistance welding process.

As shown in FIGS. 1 and 3, a part of the folded portion 132 may extend toward the cavity 122 of the second suction cup 120 to form a second extending portion 1322, and the second extending portion 1322 can be located inside the peripheral wall of the second suction cup 120. A gap may be provided between the second extending portion 1322 and the inner peripheral wall of the second suction cup 120. As shown in FIG. 3, the sidewall of the second extending portion 1322 close to the third welding surface 1321 form a stepped surface with the fourth welding surface 123.

Figure 6:
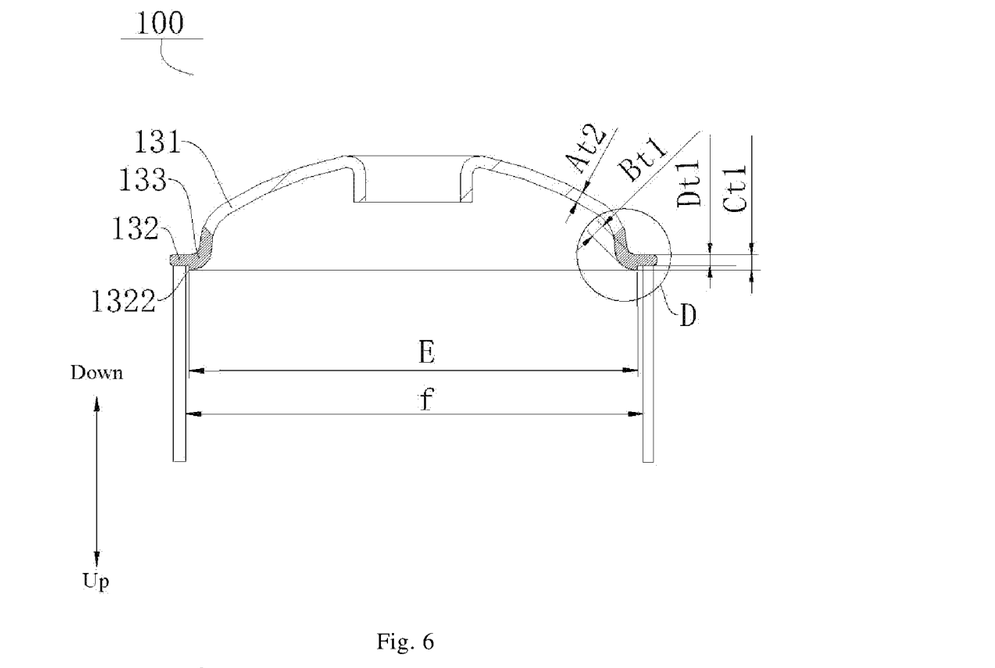
FIG. 6 is a schematic diagram showing a partial structure of the compressor liquid accumulator.

As shown in FIG. 6, the second extending portion 1322 may extend along the circumferential direction of the third suction cup 130. The outer diameter of the second extending portion 1322 can be set as E, and the inner diameter of the second suction cup 120 can be set as f, which needs to satisfy that f is greater than E. Thus, it can be realized that the second extending portion 1322 is partially located in the cavity 122 of the second suction cup 120, and the second extending portion 1322 abutting against the inner peripheral wall of the second suction cup 120 can be used to realize the positioning and limiting of the mating connection of the third suction cup 130 and the second suction cup 120. It should be noted that the second extending portion 1322 can also be provided at the second suction cup 120, and the second extending portion 1322 can be partially located in the cavity 122 of the third suction cup 130.

As shown in FIGS. 1 and 3, there is a large angular difference between a plane where the folded portion 132 is located and an extension plane of the part close to the edge of the second suction cup 120, of the second body portion 131, so that a second transition portion 133 having a transitional connection function can be formed between the folded portion 132 and the first body portion 111. The second transition portion 133 may be in a circular arc shape.

Figure 7:
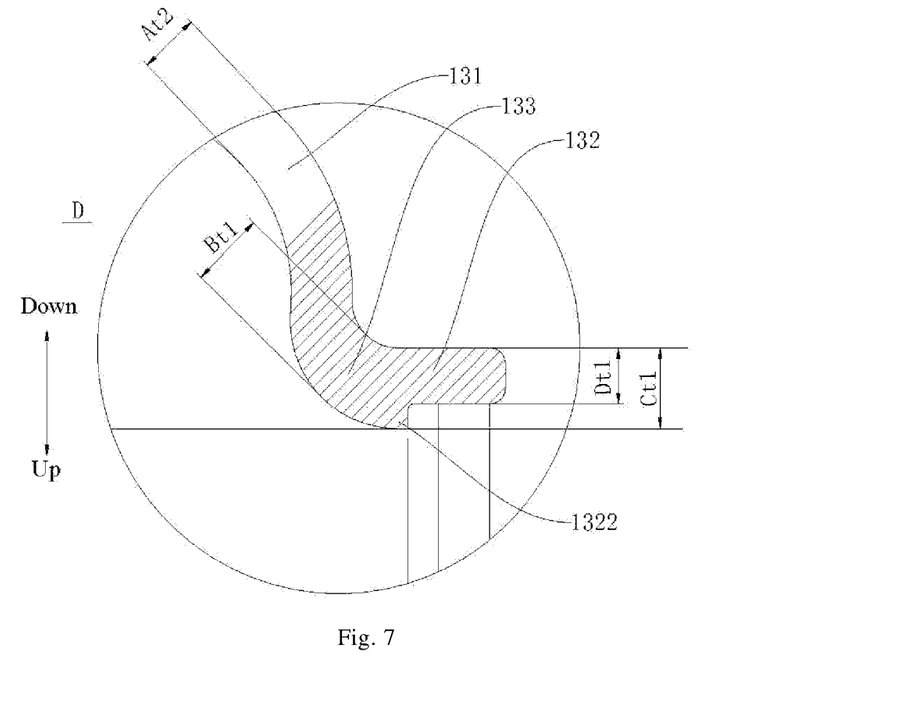
FIG. 7 is an enlarged view of part D in FIG. 6.

As shown in FIGS. 6 and 7, the wall thickness of the second body portion 131 can be set to At2, the wall thickness of the folded portion 132 can be set to Ct2, the wall thickness of the second transition portion 133 can be set to Bt2, and the distance between the fourth welding surface 123 and the bottom surface of the folded portion 132 is Dt2 in the up and down direction (the "up and down" herein refers to the positive "up and down" direction in FIG. 7), which needs to satisfy that Bt2>At2. In this way, the folded portion 132 formed by folding the second body portion 131 can have a sufficient thickness to serve as a connecting portion between the third suction cup 130 and the second suction cup 120. For Ct2>Dt2, it can be understood that the size difference between Ct2 and Dt2 is the portion of the second extending portion 1322 that extends into the cavity 122 of the second suction cup 120. By setting Ct2>Dt2, the second extending portion 1322 can be partially disposed inside the cavity 122 of the second suction cup 120 for abutting fit with the inner peripheral wall of the second suction cup 120.

Figure 9:
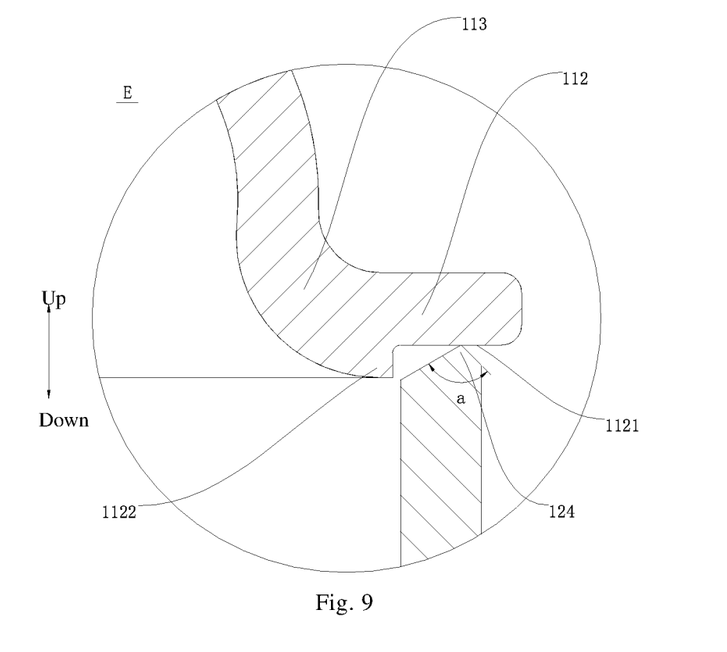
FIG. 9 is an enlarged view of part E in FIG. 8.
Figure 10:
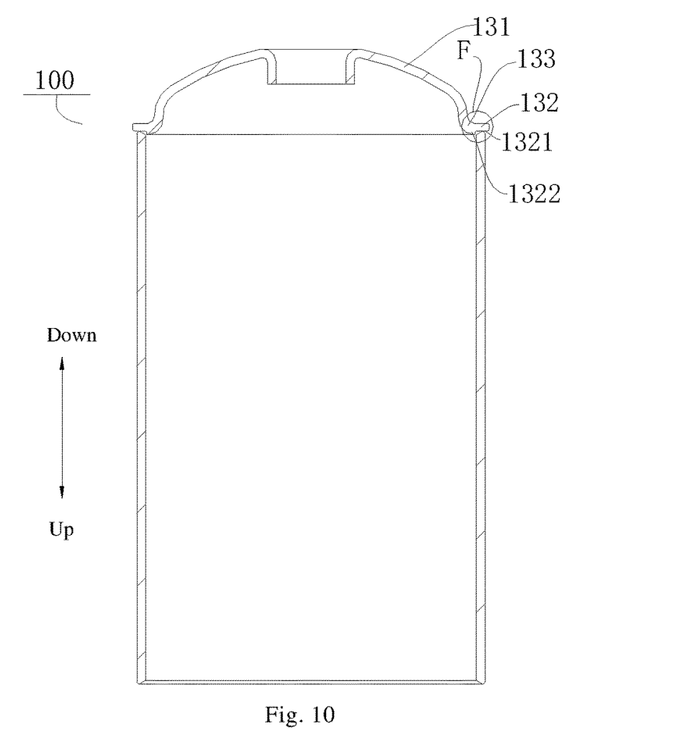
FIG. 10 is schematic diagram showing a partial structure of a compressor liquid accumulator according to another embodiment of the present disclosure.
Figure 11:
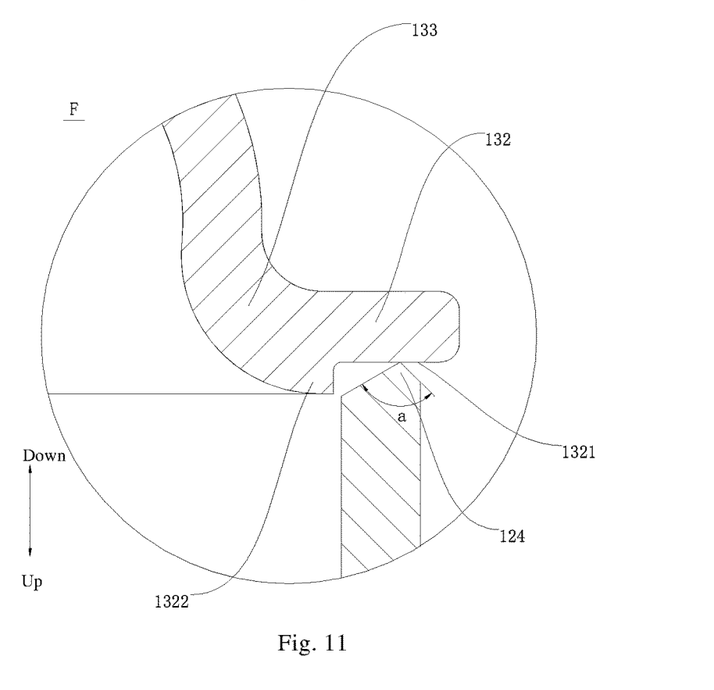
FIG. 11 is an enlarged view of part F in FIG. 10.

As shown in FIGS. 8 and 9, a sharp corner 124 may be formed at the edge, close to the flanging portion 112, of the second suction cup 120, in which the size of the sharp corner 124 can be set to a, which can satisfy 30°≤a≤150°, preferably 90°≤a≤120°. As shown in FIGS. 10 and 11, a sharp corner 124 may be also formed at the edge, close to the folded portion 132, of the second suction cup 120, in which the size of the sharp corner 124 can be set to a, which can satisfy 30°≤a≤150°, preferably 90°≤a≤120°. By providing the sharp corner 124, it is convenient to provide operation space for the welding process, and the welding surface can be formed as a bending surface, which is beneficial to increase the contact surface of welding, and thus can improve the strength of welding connection.

As shown in FIG. 1, a first suction tube 114 that can communicate with the cavity 122 can be provided above the first suction cup 110 to connect the cavity 122 with the outside. A filter assembly 140 capable of filtering impurities can be provided below the first suction cup 110. The filter assembly 140 can be pressed into the cavity 122 of the second suction cup 120 by external force at a position close to the first suction cup 110. A rolling groove structure can be formed on the peripheral wall of the second suction cup 120 at positions corresponding to the upper and lower ends of the filter assembly 140. The rolling groove structure is distributed along the circumferential direction of the second suction cup 120, and can play a role in positioning and limiting the installation of the filter assembly 140.

As shown in FIG. 1, a second suction tube 134 that can communicate with the cavity 122 can be provided under the third suction cup 130 to connect the cavity 122 with the outside. A filter assembly 140 capable of filtering impurities can be provided above the third suction cup 130. The filter assembly 140 can be pressed into the cavity 122 of the second suction cup 120 by external force at a position close to the third suction cup 130. A rolling groove structure can be formed on the peripheral wall of the second suction cup 120 at positions corresponding to the upper and lower ends of the filter assembly 140. The rolling groove structure is distributed along the circumferential direction of the second suction cup 120, and can play a role in positioning and limiting the installation of the filter assembly 140.

In the description of the present disclosure, it should be understood that the terms "upper", "lower", "horizontal", "inner", "outer", "circumferential" and the like indicate the orientation or positional relationship is that shown in the drawings, and is only for the convenience of describing the present disclosure and simplifying the description, rather than indicating or implying the pointed device or element has to have a specific orientation, and be constructed and operated in a specific orientation, and therefore cannot be understood as a limitation of the present disclosure.

In addition, the terms "first" and "second" are only used for descriptive purposes and cannot be understood as indicating or implying relative importance or implicitly indicating the number of indicated technical features. Therefore, the features defined with "first" and "second" may explicitly or implicitly include at least one of the features. In the description of the present disclosure, the "plurality" means two or more than two, unless otherwise specifically defined.

In the present disclosure, the terms "disposed", "arranged", "connected", "fixed" and the like should be understood broadly and may be either a fixed connection or a detachable connection, or an integration; may be a mechanical connection, or an electrical connection; may be directly connected, or connected via an intermediate medium; and may be the internal communication of two elements or the interaction of two elements, unless otherwise explicitly stated and defined. For those skilled in the art, the specific meanings of the above terms in the present disclosure can be understood according to specific situations.

In the present disclosure, a first feature "on" or "under" a second feature may refer to a direct contact of the first feature with the second feature or an indirect contact of the first feature and the second feature via an intermediate medium, unless otherwise explicitly stated and defined. Moreover, a first feature "above" a second feature may mean the first feature is right above or obliquely above the second feature, or merely that the first feature is located at a level higher than the second feature. A first feature "below" a second feature may mean the first feature is just below or obliquely below the second feature, or merely that the first feature is located at a level lower than the second feature.

Reference throughout this specification to "an embodiment", "one embodiment", "some embodiments", "an example", "a specific example" or "some examples" means that a particular feature, structure, material, or characteristic described in connection with the embodiment or example is included in at least one embodiment or example of the present disclosure. Thus, the appearances of the phrases such as "in some embodiments", "in one embodiment", "in an embodiment", "in an example", "in a specific example" or "in some examples" in various places throughout this specification are not necessarily referring to the same embodiment or example of the present disclosure. Moreover, the described particular feature, structure, material, or characteristic may be combined in any one or more embodiments or examples in a suitable manner. Furthermore, the different embodiments or examples and the features of the different embodiments or examples described in this specification may be combined by those skilled in the art without contradiction.

Although embodiments of the present disclosure have been shown and described in the above, it would be appreciated that the above embodiments are exemplary which cannot be construed to limit the present disclosure, and changes, alternatives, substitution and modifications can be made in the embodiments by those skilled in the art without departing from scope of the present disclosure.

What is claimed is:

1. A compressor liquid accumulator comprising:
a first portion and a second portion,
wherein the first portion has a surface facing the second portion, the surface of the first portion is provided with a first welding surface,
wherein the second portion has a surface facing the first portion, the surface of the second portion is provided with a second welding surface, and the first welding surface and the second welding surface are connected in a welded manner,
wherein the first portion and the second portion define a cavity,
wherein the first portion is provided with at least one first extending portion adjacent to the first welding surface, and the at least one first extending portion is located in a part of the cavity defined by the second portion, and
wherein a sidewall of the first extending portion forms a stepped surface with the first welding surface and a gap exists between the first extending portion and an inner peripheral wall of the second portion.

2. The compressor liquid accumulator according to claim 1, wherein a wall thickness of the second portion is L1, and a width of the first welding surface is L2 in a direction of the wall thickness of the second portion, wherein $0.6 \leq L2/L1 \leq 1$.

3. The compressor liquid accumulator according to claim 1, wherein the at least one first extending portion comprises a protrusion.

4. The compressor liquid accumulator according to claim 1, wherein:
the at least one extending portion comprises a single first extending portion;
the single first extending portion is of a ring-shape; and
the single first extending portion extends along a circumferential direction of the first portion.

5. The compressor liquid accumulator according to claim 1, wherein:
the at least one extending portion comprises a plurality of first extending portions; and
the plurality of first extending portions are distributed at intervals along a circumferential direction of the first portion.

6. The compressor liquid accumulator according to claim 1, wherein the first welding surface and the second welding surface are connected by a resistance welding process.

7. The compressor liquid accumulator according to claim 1, wherein:
the first portion is provided with a first suction tube;

the first suction tube is in communication with the cavity; and the first suction tube and the first portion are fixed by flame brazing, induction brazing or resistance welding.

8. A compressor comprising the compressor liquid accumulator of claim 1.

9. The compressor liquid accumulator according to claim 1, wherein the first portion comprises:
- a first body portion, and
- a flanging portion, formed by folding the first body portion toward an edge of the second portion and toward the exterior of the cavity,
- wherein the flanging portion has a surface facing towards the second portion, the surface of the flanging portion is the first welding surface, and the at least one first extending portion is disposed at the flanging portion.

10. The compressor liquid accumulator according to claim 9, wherein a smooth transition portion is provided between the first body portion and the flanging portion.

11. The compressor liquid accumulator according to claim 10, wherein a thickness of the smooth transition portion is Bt1, and a thickness of the first body portion is At1, wherein Bt1>At1.

12. The compressor liquid accumulator according to claim 1, wherein:
- a wall thickness of the second portion is L1, and a welding fusion portion is formed at a welding position of the first welding surface and the second welding surface; and
- a width of the welding fusion portion is L2' in a direction of the wall thickness of the second portion, wherein 0.6≤L2'/L1≤1.2.

13. The compressor liquid accumulator according to claim 12, wherein the width of the welding fusion portion is L2', wherein L2'≥1 mm.

14. The compressor liquid accumulator according to claim 1, further comprising a third portion,
- wherein the third portion is connected to the second portion, and the second portion is located between the first portion and the third portion.

15. The compressor liquid accumulator according to claim 14, wherein:
- the third portion has a surface facing the second portion, the surface of the third portion is provided with a third welding surface;
- the second portion has a surface facing the third portion, said surface of the second portion is provided a fourth welding surface; and
- the third welding surface and the fourth welding surface are connected in a welding manner.

16. The compressor liquid accumulator according to claim 14, wherein:
- one of the third portion and the second portion comprises a second extending portion;
- the second extending portion is located in the cavity; and
- the second extending portion abuts against a corresponding second portion or a corresponding third portion.

* * * * *